No. 611,604. Patented Oct. 4, 1898.
A. C. CAMPBELL.
AUTOMATIC SLOTTING MACHINE.
(Application filed Oct. 9, 1897.)
(No Model.) 2 Sheets—Sheet 1.
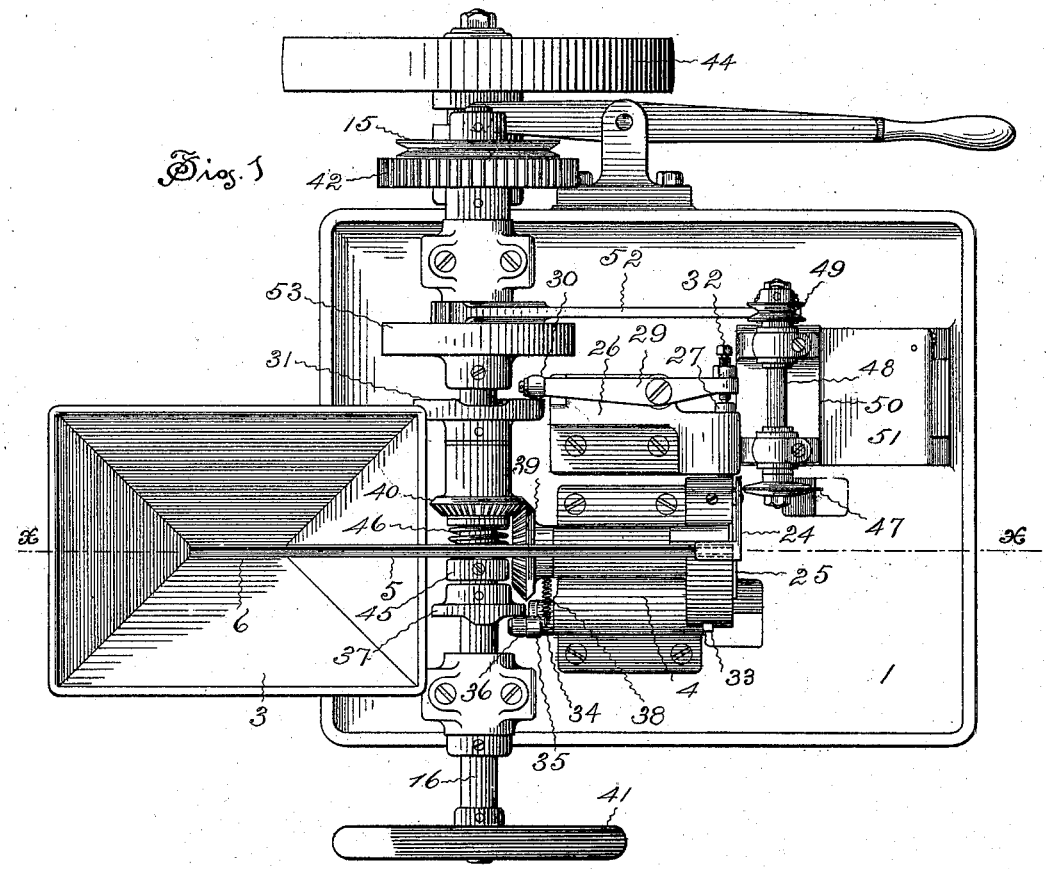
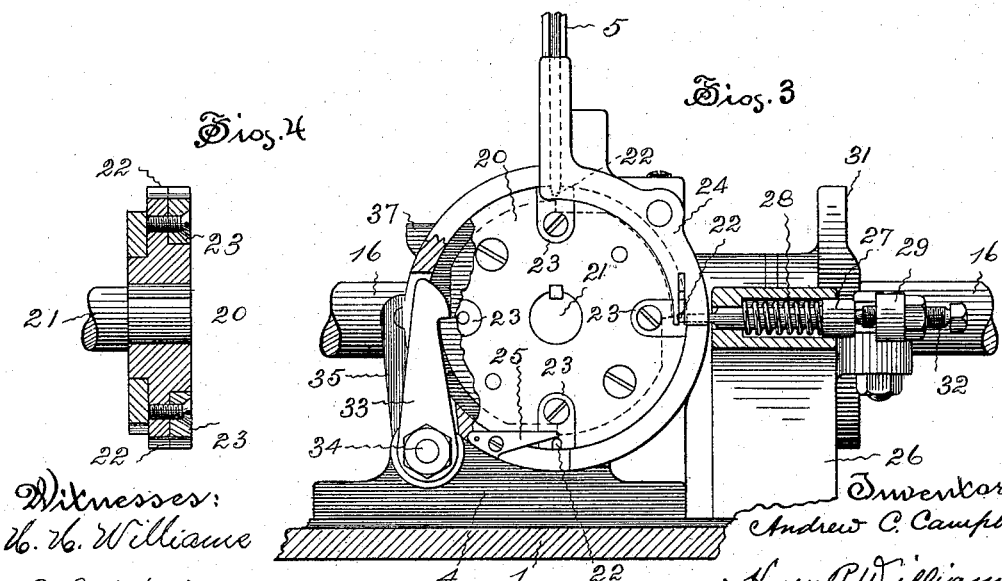
Witnesses:
H. H. Williams
E. J. Hyde
Inventor,
Andrew C. Campbell
by Harry P. Williams
atty.

No. 611,604. Patented Oct. 4, 1898.
A. C. CAMPBELL.
AUTOMATIC SLOTTING MACHINE.
(Application filed Oct. 9, 1897.)
(No Model.) 2 Sheets—Sheet 2.
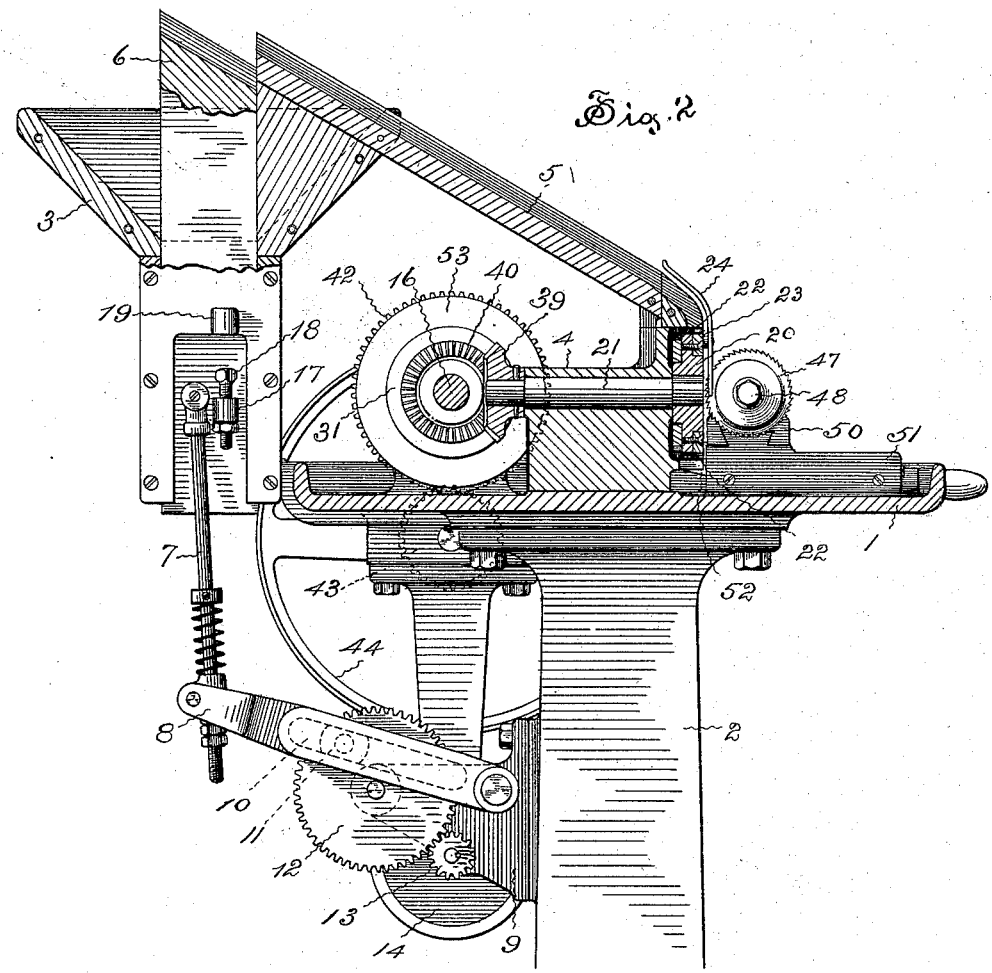
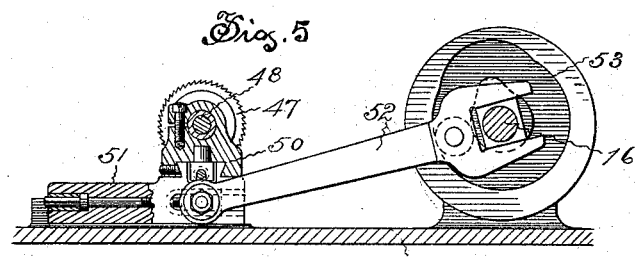

UNITED STATES PATENT OFFICE.

ANDREW C. CAMPBELL, OF WATERBURY, CONNECTICUT, ASSIGNOR TO THE
E. J. MANVILLE MACHINE COMPANY, OF SAME PLACE.

AUTOMATIC SLOTTING-MACHINE.

SPECIFICATION forming part of Letters Patent No. 611,604, dated October 4, 1898.

Application filed October 9, 1897. Serial No. 654,698. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Automatic Slotting-Machines, of which the following is a specification.

This invention relates to those machines which are provided for cutting slots in or otherwise operating upon the ends of screws, nipples, and the like small pieces.

The object of the invention is to produce a very simple and inexpensive machine which will automatically feed and accurately slot or otherwise operate upon the ends of a large number of small pieces in a short interval of time.

The embodiment of the invention set forth herein has a hopper for receiving the pieces to be operated upon, with a feed mechanism for collecting the pieces from the promiscuous mass in the hopper and delivering them in regular order to a temporarily-held carrier that at the proper time is unlocked and intermittently rotated to take the pieces successively from the feed mechanism and present them in front of the slotting-mill, saw, or other tool, which is moved toward and from the carrier and caused to operate upon the successively-presented pieces, which are firmly held by a clamp while being subjected to the action of the tool and then released when finished, so that they may be ejected from the machine, as more particularly hereinafter described, and pointed out in the claims.

Figure 1 of the accompanying drawings shows a plan of a machine which embodies the invention. Fig. 2 shows a vertical section of the machine, taken on the plane indicated by the broken line X X of Fig. 1. Fig. 3 shows an enlarged view of the face of the carrier and connected parts, with parts broken away to illustrate the carrier lock and clamp that retains the pieces while they are being operated upon. Fig. 4 shows a diametrical section of the carrier. Fig. 5 shows a view of the tool and its moving mechanism, parts being broken in section to illustrate the construction; and Fig. 6 shows detail views of the connections used between the tool-slide and its reciprocating mechanism.

In the views, 1 indicates a table, which may be mounted on any form of pedestal 2. Supported by the table is a hopper 3, and extending from this hopper to a bed 4 is a feed-trough 5. Held by the walls of the hopper so as to be movable vertically therein is an elevator 6, which has its upper end grooved to correspond with the groove of the feed-trough. Attached to this elevator is a rod 7, that is by an adjustable and yielding connection attached to the lever 8, which is pivoted to a bracket 9, secured to the side of the pedestal. Movable in the groove 10 in one face of this lever is a block 11, mounted on a stud projecting from the face of a gear 12. Meshing with this gear 12 is a pinion 13, borne by a shaft that bears a pulley 14, which is preferably belted to a pulley 15 on the shaft 16.

The rotation of the pulley 14, through the pinion 13, gear 12, and block 11, oscillates the lever 8, and this reciprocates the rod 7 and raises and lowers the elevator 6.

When the elevator is raised from its lowest position, it will carry up from the mass in the hopper one or more pieces, with their heads resting upon the upper edges of the elevator and their shanks depending into the groove. When the elevator rises to its highest position, its groove comes in line with and forms a continuation of the feed-trough groove, so that the pieces slide from the elevator by gravity and pass down the feed-trough to the carrier.

Held by a lug 17, attached to the elevator, is a screw 18, that when adjusted and held by a clamp-nut is adapted to make contact with a lug 19 in such manner as to determine the exact limit of upward movement of the elevator.

The carrier 20, which is a circular disk, is mounted on a shaft 21, held in bearings formed in the bed 4. In the periphery of the carrier are longitudinal grooves 22 about the size of the shanks of the pieces which are to be operated upon. These grooves are so arranged that one groove will be beneath the end of the feed-trough to receive a piece, and another having a piece taken from the feed-trough will be in front of the mill, saw, or other operating-tool when the carrier is stationary after each intermittent rotary movement. In the carrier shown there are four of these grooves, and each is preferably reinforced by a hardened plate 23. A guard 24 is secured to the bed in front of the end of the feed-trough and a portion of the periphery of the carrier to retain the pieces in position when they are being taken from the feed-trough and carried to the operating-tool, and attached to the bed near the bottom is a finger 25, that is arranged to extend into the path of the ends of the pieces that have been operated upon and eject them from the lowest groove as the carrier moves.

Loosely held in a recess in a block 26 is a bolt 27. This bolt is arranged to be thrown away from the periphery of the carrier by a spring 28 and to be forced toward the carrier by a lever 29, that has a roll 30 at one end in engagement with a cam 31 on the shaft 16. The end of the lever that is in engagement with the bolt is provided with an adjusting-screw 32, by means of which the amount of movement to be communicated to the bolt can be exactly regulated. The cam is timed to oscillate the lever and cause the bolt to be forced against its spring toward the carrier into engagement with a piece in a groove for firmly holding that piece while it is being subjected to the action of the mill, saw, or other tool. When the tool has finished operating, the cam releases the piece, so that it can be taken by the carrier to the ejector.

The carrier is held against rotation at the proper time by the catching of the latch 33 with a tooth formed in a part of or in a plate secured to the carrier. The latch is mounted on a rock-shaft 34, that has a rocker-arm 35 with a roll 36 in engagement with a cam 37 on the shaft 16. At the proper time this cam rocks the arm and shaft so as to release the latch from the tooth with which it engages and allow the carrier to be rotated. A spring 38 normally tends to retain the latch in engagement with the periphery of the carrier and the cam rocks the latch against the pull of this spring. There are the same number of locking-teeth that there are notches for receiving the pieces. In the form shown there are four notches for receiving the pieces and four locking-teeth.

Secured to the carrier-shaft 21 is a bevel-gear 39, which meshes with a bevel-gear 40, loosely mounted on the shaft 16. On one end of the shaft 16 is a hand-wheel 41 and on the other end is a gear 42, meshing with which is a pinion 43 on the shaft that bears the driving-pulley 44. The shaft 16 is continuously rotated through the gear and pinion by the rotation of the driving-pulley, but the carrier is only rotated intermittently. To allow this, the gear 40 is connected with the shaft by a friction device consisting of a collar 45 and spring 46. The gear 40, connected in this manner, is rotated with the shaft 16 when the carrier is free; but when the carrier is held by the latch the shaft rotates without turning the gear 40.

The mill, saw, or other cutting-tool 47 is mounted on a shaft 48, that bears a driving-pulley 49. The shaft 48 is held in bearings in a block 50, that can be adjusted on a way formed on the carriage 51, which carriage is movable on a way formed on the table. Connected with this carriage is a bar 52, that bears a roll in engagement with a cam 53 on the shaft 16. This bar is adjustably connected with the carriage, so that the exact limit of movement can be determined. When the cam is rotated and the bar reciprocated, the carriage, with the block that supports the tool-shaft, is moved back and forth toward and from the carrier.

The pieces to be operated upon are thrown promiscuously into the hopper, where they gravitate toward the center in position to be lifted by the elevator until they slide into and pass down the feed-trough to the carrier. At each intermittent rotary movement of the carrier the lowest of the pieces in the feed-trough is taken by a groove and carried in front of the tool, and after being firmly held by the clamp is subjected to the action of the tool which is moved up to accomplish its work. When the operation of the tool is completed, it is withdrawn and the carrier again moved, and this brings another piece in line with the tool and causes the slotted piece to be dropped from the bottom of the carrier. The feeding of these pieces in this machine is accomplished automatically and rapidly and the fineness of the adjustment of the connections enables the tool to be brought up so as to operate most accurately upon the firmly-held pieces. As the driving mechanisms run continuously, great speed can be attained with this machine without affecting the quality of the work performed.

I claim as my invention—

1. In combination with a rotary carrier with blank recesses in its periphery, a latch normally restraining the carrier against rotation, a rocker-arm and cam for intermittently releasing the latch from the carrier, a continuously-rotating driving-shaft, a bevel-gear loosely mounted on the driving-shaft, a collar fixed to said shaft, a spring thrusting between the collar and the gear, and a bevel-gear on the carrier-shaft whereby the carrier is rotated, when unrestrained by the latch, by the continuously-rotating driving-shaft, substantially as specified.

2. In combination with a rotary carrier with blank recesses in its periphery, a latch normally restraining the carrier against rotation, a rocker-arm and cam for intermittently releasing the latch from the carrier, a continuously-rotating driving-shaft connected by a friction mechanism with the shaft for rotating the carrier when unrestrained by the latch, a receptacle for receiving the pieces to be operated upon, a trough leading from the receptacle to the notched periphery of the carrier, a rotary tool movable toward and from the carrier, and means for moving and rotating the tool, substantially as specified.

3. In combination, a rotary carrier, means for intermittently rotating the carrier, mechanisms for supplying the pieces to be operated upon to the carrier, a clamping-plunger secured in a recess in a block adjacent to the periphery of the carrier, a spring located in the recess and normally thrusting the plunger away from the carrier, a lever with an adjustable screw-stud bearing against the end of the plunger for forcing it against the thrust of the spring and temporarily holding the pieces as they are being operated upon, a cam for oscillating the lever, a rotary tool movable toward and from the carrier, and means for moving and rotating the tool, substantially as specified.

4. In combination, a rotary carrier with a grooved periphery, a latch normally restraining the carrier against rotation, mechanism for intermittently releasing the latch from the carrier, continuously-rotating driving mechanism connected by a friction device with the carrier and rotating the carrier when unrestrained by the latch, mechanisms for supplying the pieces to be operated upon to the carrier, a clamping-plunger movable toward and from the periphery of the carrier for holding the pieces in the grooves when they are being operated upon, a rotary tool movable toward and from the carrier, and means for moving and rotating the tool, substantially as specified.

5. In combination, a rotary carrier with a grooved periphery, a latch normally restraining the carrier against rotation, mechanism for intermittently releasing the latch from the carrier, continuously-rotating driving mechanism connected by a friction device with the carrier and rotating the carrier when unrestrained by the latch, mechanisms for supplying the pieces to be operated upon to the carrier, a clamping-plunger movable toward and from the periphery of the carrier for holding the pieces in the grooves when they are being operated upon, a rotary tool movable toward and from the carrier, means for moving and rotating the tool, and a stationary finger arranged to aid the removal of the finished pieces from the grooves of the carrier, substantially as specified.

6. In combination, a receptacle for receiving the pieces to be operated upon, mechanisms for collecting the pieces from the receptacle, a rotary carrier with blank recesses in its periphery, a trough leading from the receptacle to the carrier, a latch normally restraining the carrier against rotation, mechanism for intermittently releasing the latch from the carrier, a continuously-rotating driving-shaft, a friction mechanism connecting the continuously-rotating shaft and the carrier-shaft whereby the carrier is rotated when unrestrained by the latch, and a clamping-plunger movable toward and from the periphery of the carrier for holding the pieces in the grooves when they are being operated upon, substantially as specified.

7. In combination, a receptacle for receiving the pieces to be operated upon, mechanisms for collecting the pieces from the receptacle, a rotary carrier adapted to receive the pieces from the collector, a latch normally restraining the carrier against rotation, mechanism for intermittently releasing the latch from the carrier, a continuously-rotating driving mechanism, a friction device between the continuously-rotating mechanism and the carrier whereby the carrier is rotated when unrestrained by the latch, and a clamping-plunger independent of the carrier for temporarily holding the pieces when they are being operated upon, substantially as specified.

8. In combination, a rotary carrier, means for intermittently rotating the carrier, mechanisms for supplying the pieces to be operated upon to the carrier, a clamping-plunger supported in a recess in a block adjacent to the periphery of the carrier, a spring located in the recess and normally thrusting the plunger away from the carrier, a lever with an adjustable screw-stud bearing against the end of the plunger for forcing it against the thrust of the spring and temporarily holding the pieces when they are being operated upon, and a cam for oscillating the lever, substantially as specified.

9. In combination, a rotary carrier, a latch normally restraining the carrier against rotation, mechanism for intermittently releasing the latch from the carrier, a continuously-rotating driving mechanism, a friction device between the continuously-rotating driving mechanism and the carrier whereby the carrier is rotated when unrestrained by the latch, a clamping-plunger for holding the pieces when operated upon, a rotary tool movable toward and from the carrier, and means for moving and rotating the tool, substantially as specified.

10. In combination, a receptacle for receiving the pieces to be operated upon, an elevator for collecting the pieces from the receptacle, a trough for conducting the pieces from the elevator, a rotary carrier for receiving the successive pieces from the trough, a latch normally restraining the carrier against rotation, mechanism for intermittently releasing the latch from the carrier, a continuously-rotating driving mechanism, a friction device between the continuously-rotating driving mechanism and the carrier whereby the carrier is rotated when unrestrained by the latch, and a clamping-plunger adapted to hold the pieces when operated upon, substantially as specified.

11. In combination, a receptacle for receiving the pieces to be operated upon, an elevator for collecting the pieces from the receptacle, a trough for conducting the pieces from the elevator, a rotary carrier for receiving the successive pieces from the trough, a latch normally restraining the carrier against rotation, mechanism for intermittently releasing the latch from the carrier, a continuously-rotating driving mechanism, a friction device between the continuously-rotating driving mechanism and the carrier whereby the carrier is rotated when unrestrained by the latch, a clamping-plunger for temporarily holding the pieces in the carrier, a rotary tool movable toward and from the carrier, and means for moving and rotating the tool, substantially as specified.

12. In combination, a receptacle for receiving the pieces to be operated upon, an elevator for collecting the pieces from the receptacle, a trough for conducting the pieces from the elevator, a rotary carrier for receiving the successive pieces from the trough, a latch mounted upon a rock-shaft normally restraining the carrier against rotation, a cam for rocking the shaft and latch and intermittently moving it from engagement with the carrier, a continuously-rotating driving mechanism, and a friction device between the continuously-rotating mechanism and the carrier whereby the carrier is rotated when unrestrained by the latch, substantially as specified.

13. In combination, a receptacle for receiving the pieces to be operated upon, an elevator for collecting the pieces from the receptacle, a trough for conducting the pieces from the elevator, a carrier for receiving the successive pieces from the trough, continuously-rotating mechanism for rotating the carrier, a latch mounted on a rock-shaft for temporarily restraining the rotating movement of the carrier, a cam for rocking the shaft and moving the latch from engagement with the carrier, a clamp-bolt adapted to move toward and from the periphery of the carrier for temporarily holding the pieces, a rotary tool movable toward and from the carrier, and mechanism for moving and rotating the tool, substantially as specified.

14. In combination, a receptacle for receiving the pieces to be operated upon, an elevator for collecting the pieces from the receptacle, a trough for conducting the pieces from the elevator, a carrier for receiving the successive pieces from the trough, continuously-rotating mechanism for rotating the carrier, a latch mounted on a rock-shaft for temporarily restraining the rotary movement of the carrier, a cam for rocking the shaft and moving the latch from engagement with the carrier, a clamp-bolt adapted to move toward and from the periphery of the carrier for temporarily holding the pieces, a lever for moving the clamp-bolt, a cam for oscillating the clamp-bolt lever, a rotary tool movable toward and from the carrier, and mechanism for moving and rotating the tool, substantially as specified.

15. In combination, a receptacle for receiving the pieces to be operated upon, an elevator for lifting the pieces from the receptacle, mechanism for reciprocating the elevator, a trough for conducting the pieces from the elevator, a carrier with a grooved periphery for receiving the successive pieces from the trough, continuously-rotating mechanism for rotating the carrier, a latch adapted to temporarily restrain the rotary movement of the carrier, a rocker-shaft with a rocker-arm for oscillating the latch, a cam for oscillating the rocker-arm, a clamp-bolt adapted to move toward and from the periphery of the carrier for temporarily holding the pieces in the grooves, a lever for moving the clamp-bolt toward the carrier, a cam for oscillating the clamp-bolt lever, a rotary tool mounted in bearings supported by a movable block mounted upon a movable carriage, a bar connected with the carriage, a cam for reciprocating the bar, and means for rotating the tool, substantially as specified.

ANDREW C. CAMPBELL.

Witnesses:
   GEO. R. LEGGETT,
   H. R. WILLIAMS.